Patented Aug. 28, 1945

2,383,627

UNITED STATES PATENT OFFICE 2,383,627

POLYMERIZATION CATALYST

Robert M. Thomas, Union, Donald C. Field, Linden, and Harold C. Reynolds, Jr., Roselle Park, N. J., assignors, by mesne assignments, to Jasco, Incorporated, a corporation of Louisiana No Drawing. Application August 22, 1940, Serial No. 353,668

7 Claims. (Cl. 252—245)

This invention relates to high molecular weight, sulfurizable, olefinic polymers; relates particularly to a polymerization catalyst for the production of sulfurizable interpolymers of iso-olefinic and diolefinic substances; and relates especially to methods for preparing, preserving and utilizing a catalyst for the interpolymerization of such olefinic substances.

It has been found that mixtures of iso-olefins such as isobutylene with diolefins such as butadiene, isoprene, pentadiene, dimethyl butadiene and similar diolefins, preferably conjucated, will, when treated with a powerful polymerization catalyst at low temperatures, polymerize into very high molecular weight copolymers or interpolymers of the iso-olefin and diolefin which have the unique and very valuable characteristics of a relatively low degree of chemical unsaturation as indicated by an iodine number ranging from 1 to 40 or 50, and the capability of combining with sulfur in spite of the low unsaturation, to produce a cured, plastic, elastic material which has a high elongation ranging from about 800% to about 1200%, an elastic limit, a high tensile strength ranging from about 2000 to about 4500 pounds per square inch, the capability of being compounded with a wide range of fillers and other substances, and in addition a high flexure resistance and a high abrasion resistance. The resulting material is not a synthetic rubber, in view of the low unsaturation and the very great difference in chemical reactivity, but is an excellent and high grade substitute for rubber.

In the preparation of these interpolymers, the olefinic materials are mixed at a low temperature which is below —10° C., and preferably lies in the range from —40° C. to —100° C. or —150° C. or even lower, and the catalyst used is one which is active at these low temperatures.

The preferred catalyst is a solution of a Friedel-Crafts type catalyst, preferably aluminum chloride, in a low freezing solvent such as ethyl or methyl chloride (or such other substances as propyl or butyl chloride or carbon disulfide or other low freezing solvents which enhance rather than reduce the catalytic power of the combination may be used). Various other Friedel-Crafts type catalysts may be used including titanium tetra chloride, uranium chloride and zirconium chloride. Thus the catalyst is a solution of a metal or metalloid halide in a solvent which retains or increases its catalytic activity; does not freeze at polymerization temperatures as low as those above indicated (the limiting temperature with ethyl chloride is approximately —138° C.; with methyl chloride the limiting temperature is slightly higher, viz. —94° C.) and at the desired low polymerization temperatures retains its full catalytic power for the production of the desired interpolymers of iso-olefins and diolefins with high molecular weights ranging from about 15,000 to 150,000 or above.

In the preparation of these interpolymers it is found, however, that the quality of the catalyst is critical, and vital to the preparation of satisfactory copolymers or interpolymers, and unless the catalyst is of the very highest quality, the resulting interpolymers are low in molecular weight and contain substances which interfere with the subsequent curing operation by the production of blisters, bubbles, and discontinuity in the body of the cured material, and are in other ways disadvantageous because of low tensile strength, low elongation and low physical properties generally. It may be noted that copolymer material having an average molecular weight below about 15,000 does not cure with sulfur to give a product of the desired excellence in mechanical properties.

The average molecular weight of a given polymer is a function of the reaction temperature as well as a function of the power of the catalyst and the catalyst concentration. Accordingly, the presence of impurities in the catalyst to a considerable extent determines the amount of low molecular weight impurities in the polymer. It is also found that while the aluminum chloride dissolves readily in the alkyl halide, and does not form an inert or easily solidified complex, the process of dissolving this catalyst is generally accompanied by the formation of small quantities of hydrogen chloride which is a powerfully interfering impurity so that, in the preparation of the catalyst, the greatest possible care must be used to avoid the presence of hydrogen chloride and to avoid any degradation reaction which might yield hydrogen chloride or other deleterious substances.

The present invention is based upon the discovery that, while the solution of the Friedel-Crafts type catalyst such as aluminum chloride in an alkyl halide such as ethyl or methyl chloride must be prepared at temperatures at or near to room temperature or at the boiling temperature of the alkyl halide under atmospheric pressure, the catalyst must be purified, stored, and used at much lower temperatures, preferably below —23° C. and even at temperatures ranging from —78° C. to —100° C.

The invention further depends upon the new and unexpected characteristic of the solution involving a conspicuous difference in the reactivity of the hydrogen chloride and the aluminum chloride in the solution at the low temperatures. That is, at temperatures above about −23° C., both the aluminum chloride and the hydrogen chloride are strongly reactive with alkaline substances generally, whereas at temperatures below about −23° C., the hydrogen chloride remains reactive with alkaline bodies, while the aluminum chloride becomes relatively non-reactive with such bodies.

Based upon this change in character with lowering of temperature, the invention then presents the series of steps of dissolving a Friedel-Crafts type catalyst (such as aluminum chloride) in an alkyl halide (such as ethyl or methyl chloride) or other suitable solvents, at or near room temperature, under pressure if desired, to maintain the solvent in liquid condition at the desired solution temperature, then cooling the solution either immediately, or after an interval, to a temperature below −23° C. and preferably to a temperature of approximately −78° C.; then passing the catalyst solution over a body of solid alkaline material, preferably soda lime, to remove any hydrogen chloride present, and also possibly to remove other interfering bodies, and thereafter storing the catalyst at a temperature below −23° C. preferably in the neighborhood of −78° C., or even lower until the catalyst is used for the polymerization reaction. The previously mentioned mixture of an iso-olefin with a diolefin is then prepared, the catalyst added, and the desired polymer obtained, which is thereafter compounded with various ingredients including sulfur and a sulfurization aid, then heated to produce the high grade elastic polymer desired.

Thus an object of the invention is to prepare a catalyst solution at elevated temperature, to store it at elevated or low temperatures, to purify it by passage at low temperature over an alkaline body for selectively removing impurities, especially hydrogen chloride, to store the purified catalyst at low temperatures for convenient time intervals and thereafter to polymerize mixtures of olefinic substances at low temperatures to produce high molecular weight interpolymers of low unsaturation which are capable of sulfurization to yield high strength, plastic, elastic substances. Other objects of the invention will be apparent from the following description.

In practicing the invention, it is desirable that a relatively pure, high grade alkyl halide be used. For this purpose commercial ethyl or methyl chloride or the recycled stock from previous polymerization procedures is fractionally distilled from solid aluminum chloride, and the vapors preferably passed through an alkaline body such as soda lime followed by a drying agent such as $CaCl_2$ to yield a pure, neutral alkyl halide which is substantially free from low olefinic polymers, and substantially wholly free from hydrogen chloride and water. The resulting pure alkyl halide is then used as solvent for the Friedel-Crafts type catalyst which is preferably aluminum chloride. The alkyl halide may be handled at its atmospheric pressure boiling point which for ethyl chloride is +12° C. and for methyl chloride is −23° C., and the solid aluminum chloride is added with stirring for a substantial period until the solution is saturated, or until the desired amount of aluminum chloride has been dissolved. Alternatively, the alkyl halide may be placed in a pressure vessel with the solid aluminum chloride and the temperature raised to room temperature or higher, to produce a stronger solution, or else may be employed with cooling to produce the ordinary solutions desired in a system closed to the atmosphere. The catalyst solution is then drained from undissolved solids, either excess aluminum chloride, or impurities, and may be stored at or near room temperature for as long a period as desired.

At a convenient time after the solution has been prepared, it is cooled to a temperature below about −23° C., a desirable temperature being that of solid carbon dioxide at −78° C. It is preferable that the time of standing at elevated temperatures be minimized, since considerable loss of solvent and of solute may occur if the storage time at room temperature is unduly prolonged, depending, of course, upon the solvent employed, its exact purity, etc.. The cooled catalyst solution is then passed over a body of soda lime (mixed sodium hydroxide and calcium oxide) which also is held at the same low temperature. Instead of soda lime, combinations of sodium hydroxide with barium hydroxide, calcium hydroxide, magnesium hydroxide, and magnesium oxide may be just as effective in removing the last traces of water and HCl. Likewise combinations of calcium oxide with barium hydroxide and magnesium hydroxide may also be useful. It is found during the passage of the aluminum chloride solution through the soda lime, at such a low temperature, that almost no reaction between the aluminum chloride and the soda lime occurs, but that any hydrogen chloride present in the solution is extremely reactive, and is therefore substantially entirely removed from the catalyst solution. The catalyst solution is then ready for immediate use if desired and shows the full catalytic power. Alternatively, the catalyst solution may be stored without substantial loss of catalytic power for substantial periods of time if the storage occurs at temperatures below about −23° C., preferably at −78° C. or even lower. Substantially no loss in catalytic power occurs during storage at these temperatures for time intervals as long as 48 hours, and only negligible loss in catalytic power occurs during storage for as long as 96 hours.

The catalyst having been prepared as above described and sent to storage, a mixture of an iso-olefin such as isobutylene, and a diolefin such as butadiene, or isoprene, or pentadiene, or dimethyl butadiene is prepared in the proportion of from 70 parts to 99 parts of the iso-olefin with 30 parts to 1 part of the diolefin and mixed with a refrigerant diluent such as liquid ethylene in the proportion of from 100 to 500 parts, or with a non-diluent refrigerant such as finely divided solid carbon dioxide in excess which is preferably employed in the presence of a diluent such as ethyl or methyl chloride in the proportion of from 50 to 150 parts.

The purified and stored catalyst is then added to the cooled olefinic mixture, preferably in a finely subdivided form such as a spray applied to the surface of the rapidly stirred cold olefinic mixture. The polymerization reaction proceeds quickly for the formation of the desired polymer. When the desired proportion of reactants in the mixture have polymerized, the reaction is desirably quenched by the addition of an oxygenated substance such as propyl alcohol, or an alkali such as ammonia or a water solution of alkali, and the solid polymer removed and brought up to room temperature.

The polymer is desirably washed with water to remove traces of the catalyst decomposition products and may then be compounded according to the following formula:

|  | Parts |
|---|---|
| Interpolymer | 100 |
| Sulfur | 1.5 |
| Stearic acid | 3 |
| Zinc oxide | 5 |
| Tuads (tetra methyl thiuram disulfide) | 1 |
| Carbon black | 70 |

This compound is preferably prepared upon the open roll mill, combining the first four ingredients at a temperature above about 135° C., followed by the addition of carbon black and the Tuads at a lower temperature, e. g. below 100° C. to avoid a premature cure. The material is then heated, in a mold or under open steam pressure, at a temperature ranging from 135° C. to 175° C. for a time interval ranging from about 15 minutes to 4 hours, depending, of course, upon the temperature employed and the bulk of the article being cured.

When so compounded and cured, a good copolymer has shown the characteristics set forth in the subjoined table:

| | |
|---|---|
| Tensile strength | 3,000 |
| Elongation per cent | 950 |
| Shore hardness degrees | 60 |
| Abrasion resistance ccs. per H. P. hour | 105 |
| Flexure resistance to incipient cracking | 1,000,000 |

Thus the catalyst as produced by the described procedure permits of the production at will of a high grade polymeric substance from mixtures of an iso-olefin with a diolefin.

Example 1

A quantity of 10 liters of methyl chloride was fractionally distilled over AlCl₃, passing the distillation vapors through a body of soda lime granules, followed by anhydrous CaCl₂. The first 5% of distilled vapors was discarded, and a single cut containing approximately 75% to 85% of the original material was condensed and recovered at the boiling temperature of −23.7° C. To 1 liter of this narrow cut fraction was then added at its B. P. under atmospheric pressure, 20 grams of commercial aluminum chloride of which approximately 10 grams dissolved within a period of 15 minutes. At the end of this time the material was filtered, diluted with an equal volume of MeCl and passed to a storage chamber maintained at a temperature below −23° C. The prepared polymerization catalyst was stored at this temperature for a period of 7 days. At the end of this time, a mixture of 80 parts of isobutylene and 20 parts by volume of butadiene was prepared with 200 parts by volume of liquid ethylene, the temperature of the completed mixture at atmospheric pressure being approximately −98° C. The stored catalyst was then added to the olefinic mixture by spraying the catalyst solution in the form of a fine mist over the surface of the mixed cooled olefins, while stirring the mixture vigorously. The polymerization proceeded rapidly and was completed within the period of approximately 3 minutes. At the completion of the polymerization reaction, the catalyst was quenched by the addition of isopropyl alcohol and the solid polymer was separated from the polymerization mixture and warmed up to room temperature by kneading in hot water. A representative example of this polymerization reaction produced a polymer having an average molecular weight of about 80,000 by the Staudinger method and a Weij's unsaturation value corresponding to 0.8 mole per cent of butadiene in the polymer.

One hundred parts of this polymer were compounded with 5.0 parts of zinc oxide, 3.0 parts of stearic acid, 2.0 parts of sulfur and 1 part of Tuads (tetramethyl thiuram disulfide). This material was then cured in a mold at a temperature of 155° C. for 30 minutes; test samples were cut from the cured material and found to have an elongation of 950% and a tensile strength of 3250 pounds.

Example 2

A suitable quantity of methyl chloride was distilled from aluminum chloride, through soda lime, etc., as in Example 1, and a similar proportion of aluminum chloride dissolved therein, and the solution sent to storage under pressure at room temperature for 72 hours. At the end of this time the material was used as a catalyst for a polymerization reaction as described in Example 1. The resulting polymer showed a tensile strength of only 1830 pounds per square inch, thus showing that the catalyst had become poisoned and was of diminished utility due to its undesirable character.

A further portion of the stored catalyst was then cooled to a temperature of −78° C. and passed through a bed of 2 feet of soda lime in a tube at −78° C. The resulting purified catalyst was then used for the polymerization reaction as described in Example 1, and a polymer having tensile strength after curing of 3070 pounds per square inch was produced.

To show in still further detail the temperature effect, a further portion of the same catalyst was passed through a 6 inch depth of soda lime in a tube under pressure at room temperature, then cooled to −78° C. and applied to the polymerization reactants. The solution was found to be "dead" and wholly inactive, due apparently to the removal of much or all of the aluminum chloride by the soda lime at the temperature used.

Similarly, aluminum chloride was placed in a cartridge and dissolved in methyl chloride at room temperature, without cooling, under pressure, then cooled to −78° C. and passed through a 6 inch deep bed of soda lime. This catalyst solution was then used for the polymerization reaction as described in Example 1, and produced a polymer which after compounding and curing had a tensile strength of 3040 pounds per square inch.

The above disclosed procedures are particularly applicable to catalysts prepared from the alkyl halides in which aluminum chloride or other metal or metalloid halide are dissolved because of the slight but perceptible tendency for the halide to react with the organic halide to produce hydrogen chloride, which reaction at room temperature is of substantial consequence. The same procedure is applicable to solutions in any of the alkyl halide substances according to the invention. It has been observed that in the preparation of these catalysts, it is desirable that there be at least one hydrogen atom attached to the carbon of the molecule to which the chlorine is attached; carbon tetrachloride being less satisfactory as a catalyst solvent. The higher halides such as the propyl and butyl halides in their various forms are usable in some instances and a similar reaction is found to occur for the liberation of hydrogen chloride which also may be removed by the purification treatment above disclosed.

The "Friedel-Crafts catalyst" above-mentioned may be any of the group of substances indicated by N. O. Calloway in his article on "The Friedel-Crafts synthesis" in the issue of "Chemical Reviews" published for the American Chemical Society at Baltimore in 1935, being volume XVII, number 3, the article beginning on page 327, the list of Friedel-Crafts catalysts being particularly well-shown on page 375.

Other solvents are known to be useful in the preparation of this catalyst, particularly carbon disulfide. Carbon disulfide of course contains no hydrogen and therefore it does not of itself form hydrogen chloride. Nevertheless, when this catalyst solution is used, and the solvent recycled, there is a definite tendency for the formation of harmful acidic and deleterious substances at certain stages of the recycling procedure, some of which collects in the carbon disulfide used for the catalyst. The contaminating substances from whatever source derived are also readily removed by the same reaction procedure as above disclosed. The same reaction is applicable to the other available solvents and to other catalysts such as boron trifluoride and the various other Friedel-Crafts type catalysts.

It may be noted further that in the case of all of these catalysts solvents, the presence of even traces of moisture tends to develop corresponding quantities of hydrogen chloride, by hydrolysis of the aluminum chloride, and this is true of all of the solvents used, including the alkyl halides and carbon disulfide as well as any other solvents. Because of this reaction, and the difficulty of obtaining absolutely dry solvents, almost any such catalyst solution, will contain from traces, to substantial quantities, of dissolved hydrogen chloride which, in view of its strong poisoning effect upon the polymerization reaction, is desirably removed by the above procedure.

It may be noted that there is a definite and specific critical temperature, above which not only the hydrogen chloride, but the aluminum chloride as well is removed from the catalyst solution and below which only the hydrogen chloride is removed. This critical temperature appears to be about $-23°$ C. The exact value appears to vary with the character of the solvent and with the catalyst substance; to some extent with the details of preparation of the catalyst, including the solution temperature, and to some extent with the source of the aluminum chloride, and its purity. It is found that different grades of aluminum chloride dissolve differently, yield catalyst solutions of different power and have different critical temperature, the reasons for which are as yet unknown.

Thus the invention consists essentially in the preparation and purification of a solution of a Friedel-Crafts type catalyst in an alkyl halide for use as a catalyst, the preparation being conducted at a temperature near to room temperature, or near to the boiling point of the alkyl halide in order to obtain a relatively high concentration of dissolved Friedel-Crafts type catalyst; thereafter the storage, with or without dilution by additional alkyl halide, at a temperature below $-23°$ C. and the use of the catalyst as a polymerization agent with mixed olefins after a relatively short storage interval; or the storage of the solution with or without diluting, for substantial lengths of time at or near room temperature, followed by a cooling to a temperature below $-23°$ C., the passage of the cooled catalyst solution through an alkali of the type of soda lime, and thereafter the use of the purified solution with or without further storage at temperatures below $-23°$ C. as a polymerization catalyst for the production from mixed olefins of an interpolymer capable of being cured with sulfur to produce a material having high tensile strength, high elongation, high abrasion resistance and high flexure resistance.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In the preparation of a low temperature polymerization catalyst for the low temperature polymerization of olefinic material at temperatures within the range of $-10°$ C. to $-150°$ C., the steps in combination of dissolving a Friedel-Crafts catalyst in an alkyl halide having less than 3 carbon atoms at a temperature above about $-23°$ C., cooling the solution to a temperature between $-20°$ C. and the freezing point of the alkyl halide, and passing the cooled solution through an alkaline solid.

2. In the preparation of a low temperature polymerization catalyst for the polymerization of olefinic material at temperatures within the range of $-10°$ C. to $-150°$ C., the steps of preparing a catalyst comprising in combination the dissolving of a Friedel-Crafts catalyst in an alkyl halide having less than 3 carbon atoms per molecule at a temperature above about $-23°$ C., cooling the solution to a temperature of approximately $-78°$ C., and passing the cooled solution over an alkaline solid.

3. In the preparation of a low temperature polymerization catalyst for the polymerization of olefinic material at temperatures within the range of $-10°$ C. to $-150°$ C., the steps of preparing a catalyst comprising in combination the dissolving of a Friedel-Crafts catalyst in an alkyl halide having less than 3 carbon atoms per molecule at a temperature above about $-23°$ C., cooling the solution to a temperature of approximately $-78°$ C., and passing the cooled solution over an alkaline solid comprising sodium hydroxide.

4. In the preparation of a low temperature polymerization catalyst for the polymerization of olefinic material at temperatures within the range of $-10°$ C. to $-150°$ C., the steps of preparing a catalyst comprising in combination the dissolving of a Friedel-Crafts catalyst in an alkyl halide having less than 3 carbon atoms per molecule at a temperature above about $-23°$ C., cooling the solution to a temperature of approximately $-78°$ C., and passing the cooled solution over an alkaline solid comprising soda lime.

5. In the preparation of a low temperature polymerization catalyst for the polymerization of olefinic material at temperatures within the range of $-10°$ C. to $-150°$ C., the steps of preparing a catalyst comprising in combination the dissolving of a Friedel-Crafts catalyst in an alkyl halide having less than 3 carbon atoms per molecule at a temperature above about $-23°$ C., cooling the solution to a temperature of approximately −78° C., and passing the cooled solution over an alkaline solid comprising soda lime at a temperature between −23° C. and the freezing point of the alkyl halide.

6. In the preparation of a low temperature polymerization catalyst for the polymerization of olefinic material at temperatures within the range of −10° C. to −150° C., the steps of preparing a catalyst comprising in combination the dissolving of a Friedel-Crafts catalyst in an alkyl halide having less than 3 carbon atoms per molecule at a temperature above about −23° C., cooling the solution to a temperature of approximately −78° C., and passing the cooled solution over an alkaline solid comprising a mixture of alkaline oxides and hydroxides.

7. In the preparation of a low temperature polymerization procedure catalyst for the polymerization of olefinic material at temperatures within the range of −10° C. to −150° C., the steps of preparing a catalyst comprising in combination the dissolving of a Friedel-Crafts catalyst in an alkyl halide having less than 3 carbon atoms per molecule at a temperature above about −23° C., cooling the solution to a temperature of approximately −78° C., and passing the cooled solution over an alkaline solid comprising sodium hydroxide and dehydrating the solution.

ROBERT M. THOMAS.
DONALD C. FIELD.
HAROLD C. REYNOLDS, Jr.